(No Model.) 2 Sheets—Sheet 1.
A. WAKEMAN.
BAIT FOR CATCHING FISH.
No. 339,952. Patented Apr. 13, 1886.
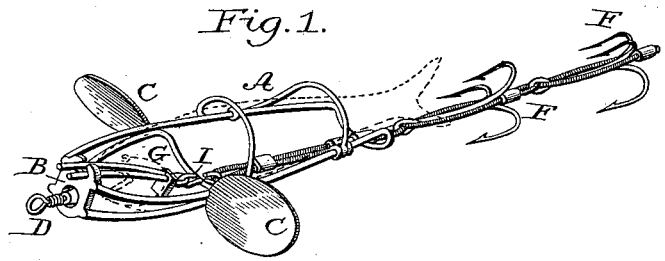
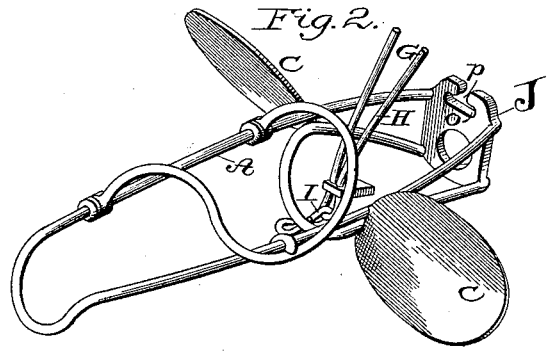
Witnesses:
James F. DuHamel
R. S. Ferguson
Inventor:
Archer Wakeman,
by Dodge Son,
his Attys.

(No Model.) 2 Sheets—Sheet 2.

A. WAKEMAN.
BAIT FOR CATCHING FISH.

No. 339,952. Patented Apr. 13, 1886.

Witnesses:
Jas. F. Duhamel
R. S. Ferguson

Inventor:
Archer Wakeman,
by Dodge & Son,
his Attys.

UNITED STATES PATENT OFFICE.

ARCHER WAKEMAN, OF CAPE VINCENT, NEW YORK.

BAIT FOR CATCHING FISH.

SPECIFICATION forming part of Letters Patent No. 339,952, dated April 13, 1886.

Application filed September 3, 1885. Serial No. 176,091. (No model.)

*To all whom it may concern:*

Be it known that I, ARCHER WAKEMAN, of Cape Vincent, in the county of Jefferson and State of New York, have invented certain new and useful Improvements in Bait for Catching Fish, of which the following is a specification.

My invention relates to bait for fishing; and it consists in a skeleton bait, preferably in imitation of a minnow, and furnished with inclined blades for producing a rotary motion, adapted to receive within it a live minnow, a piece of meat, or other suitable bait, and provided with a clasp or holder for retaining the edible bait within the skeleton frame, hooks being attached to said frame to secure the fish.

Figure 3:
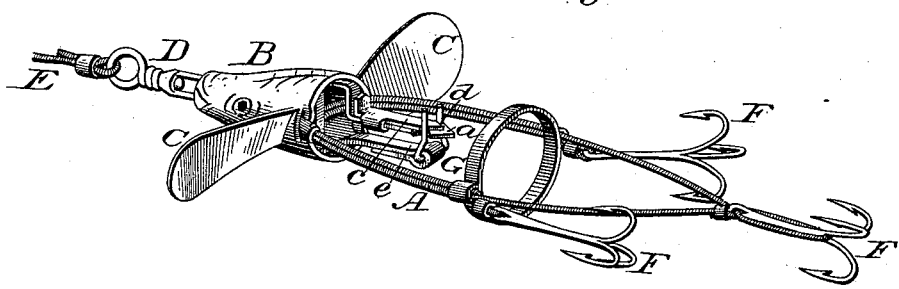
Figure 4:
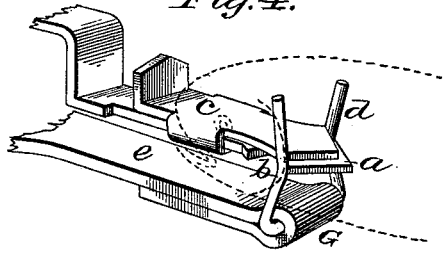
Figure 5:
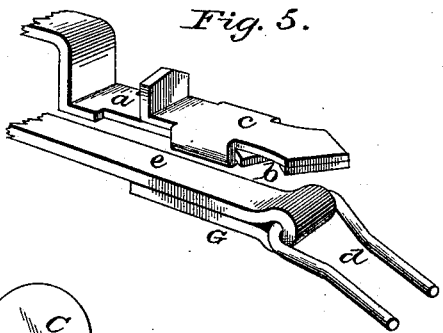

In the drawings, Figure 1 is a perspective view of my improved device; Fig. 2, an enlarged view of the clasp or fastening for securing the minnow or edible bait; Fig. 3, a view showing a modified form of the device; Figs. 4 and 5, views illustrating the construction and operation of the clasp of said modified form, and Fig. 6 a view illustrating a third form of clasp or fastening.

Heretofore artificial minnows, flies, and other forms of bait, in imitation of living bait, have been employed for fishing, hooks being attached to secure the fish seizing such bait. In other cases edible bait has been employed—such as meat or live minnows—but such bait has hitherto been placed directly upon the hook or hooks, and in practice it has been found necessary to bait the hooks a number of times for each catch, the bait being often taken from the hook by the fish without their being caught by the hooks. Such edible bait, especially live minnows, is the most satisfactory of any that can be used; but the quantity of such bait hitherto required has always been an obstacle to its general use.

My invention is designed to overcome this obstacle, while at the same time securing all the benefits of the most desirable bait.

To this end I construct my skeleton bait as represented in the drawings, in which A indicates a skeleton body, preferably of wire or wire-wrapper string—such as is used for the deeper-toned strings of a violin—and B the head or fore end of the device provided with inclined blades or wings C, which impart a rotary motion to the device as it is drawn through the water or acted upon by the current of a running stream.

Figure 6:
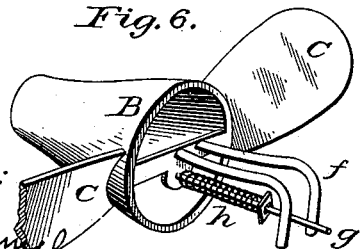

The head or front end section may be simply a plate, as in Figs. 1 and 2, or of tubular form, as in Figs. 3 and 6, and contains a swivel, D, connecting it with the snood E, as in devices hitherto made.

At suitable points, either at the tail alone or at the upper and lower sides, about midway between the ends, and also at the tails, I apply hooks F, advisably gang or cluster hooks, as shown. The bait, whether minnow, meat, or other, is placed within the skeleton frame or body A, and is retained therein by any suitable fastening device, G. In Figs. 1 and 2 I have illustrated convenient and preferred forms of such fastening device, especially designed for securing a minnow, but susceptible of use also for other bait. This fastening consists merely of a piece of spring-wire, H, doubled upon itself at a point midway between its ends similarly to a hair-pin and run through an eye or loop, I, of the frame at said point, its free ends separated or spread apart, as shown in Figs. 1 and 2, and to enter notches, *o*, formed in the sides of an opening, *p*, made in the plate J of the frame. By pressing the free ends of the wire together they may be withdrawn from the notches *o* and opening *p* and swung up to the position indicated in Fig. 2, to permit them to be passed behind the gills and through the mouth of the minnow, or through other edible bait, or to be removed therefrom. When the bait is applied, the ends of the wire latch are again sprung into the notches *o*, and said latch then serves to firmly retain the bait in place.

It will of course be understood that the bait is to be placed within the skeleton frame.

In Figs. 3, 4, and 5 I have shown a different fastening, which consists of a small spear-shaped or pointed tongue, *a*, of metal, secured at one end to the upper side of the tubular head B, and projecting back into the skeleton body A a distance ordinarily from one-half inch to one inch, the sides of the tongue being provided with notches *b*, just in rear of the beveled edges of the pointed end, as shown in Figs. 4 and 5. Upon the tongue a, and clasping the edges thereof so that it may not be displaced, is a slide, c, having a beveled or pointed end similar to that of the tongue a, but without the notches thereof, this slide being designed to move over said notches, forcing apart and pushing off the arms of a spring hasp or latch, d, pivoted in the end of an arm or bracket, e, also carried by the head-section B, as clearly shown in Figs. 3, 4, and 5.

The hasp or latch d consists simply of a piece of spring-wire bent into U form, the cross-bar forming the pivot and the two arms forming an elastic catch, which, being pressed against the beveled or pointed end of tongue a, is thereby opened, but springs together upon reaching the notches b, entering said notches, and thereby holding the hasp in an upright position and in engagement with tongue a.

When it is desired to release the latch or fastening d, the slide c is pushed back, its end being upturned to afford a convenient hold for the thumb or finger and its pointed end wedging apart and forcing off the spring-arms of the latch, as mentioned. The device being thus constructed, the bait, preferably a minnow, is passed through the open side of the skeleton frame A, the tongue a of the holder G is inserted into its mouth, (if a minnow,) and the latch d is swung up behind the gills and made to engage with the tongue a, as explained, thus securing the minnow against all possibility of escape without injuring it. The minnow, being thus uninjured, will be active and perform, as far as possible, its ordinary movements, making a most enticing bait. Being protected by the skeleton frame A, it cannot be taken by the fish; but any attempt to take it will generally result in securing the fish by the hooks F, leaving the bait uninjured.

It is apparent that the form of the latch or fastening may be further varied considerably without departing from the spirit of my invention, the form represented in Fig. 6 also answering a very good purpose. This consists of two hooks or bent arms, f, secured to the head-section B, and extending backward within the skeleton frame, and a sliding pin or stem, g, normally forced back by a spring, h, so as to pass between said hooks, as indicated. With such construction the pin is pressed back away from the hooks, the minnow pushed up between them, so that the hooks pass up behind the gills, and the spring-pin being then released enters the mouth of the minnow and secures the bait in place. Owing to the obviously-ready modification of this fastening, I do not confine myself to any specific form thereof.

I believe myself to be the first to produce a device for spinning or twirling edible bait, and the first to construct a skeleton frame with a clasp or holder for securing such bait within it; hence I claim these features broadly, and without limitation to minor details of construction or materials used.

Having thus described my invention, what I claim is—

1. A fishing device having a skeleton frame or body to contain bait, and provided with wings or blades adapted to impart motion, substantially as set forth.

2. A fishing device consisting of a skeleton frame adapted to receive bait within it and expose the same to view, and provided with a clasp to secure the bait therein, substantially as explained.

3. A fishing device consisting of a skeleton frame provided with hooks, a head or front section provided with inclined blades, and a clasp to secure the bait within the skeleton frame, said parts being combined and arranged to operate substantially as shown and described.

4. The herein-described fishing device, consisting of skeleton body A, head-section B, provided with blades C, swivel D, hooks F, and clasp G.

5. In a fishing device or bait substantially such as described, a clasp for securing edible bait in place within said device, consisting of plate J, having opening p and notches o, and swinging latch H, having spring-arms to enter said notches.

ARCHER WAKEMAN.

Witnesses:
MARTIN BRAUN,
CHARLES E. WHITNEY.